United States Patent

Bobrowski et al.

Patent Number: 5,262,089
Date of Patent: Nov. 16, 1993

[54] ADMIXTURES FOR INHIBITING CORROSION OF STEEL IN CONCRETE

[75] Inventors: Gregory S. Bobrowski, Chagrin Falls; Mark A. Bury, Berea; Stephen A. Farrington, University Heights; Charles K. Nmai, Bedford Heights, all of Ohio

[73] Assignee: Sandoz Ltd., Basel, Switzerland

[21] Appl. No.: 805,664

[22] Filed: Dec. 12, 1991

Related U.S. Application Data

[63] Continuation-in-part of Ser. No. 626,349, Dec. 12, 1990, abandoned.

[51] Int. Cl.[5] ............................................. C23F 11/00
[52] U.S. Cl. .................................... 252/396; 252/312; 252/356; 106/819; 106/823
[58] Field of Search ............... 106/14.13, 643, 644, 106/819, 823; 252/312, 356, 396

[56] References Cited

U.S. PATENT DOCUMENTS

| | | | |
|---|---|---|---|
| 4,820,344 | 5/1989 | Geke et al. | 106/14.13 |
| 4,888,132 | 12/1989 | Kohashi et al. | 106/14.13 |
| 4,971,721 | 11/1990 | Takahashi et al. | 252/314 |
| 4,990,184 | 2/1991 | Dotson et al. | 106/14.13 |

Primary Examiner—Robert L. Stoll
Assistant Examiner—Valerie Fee
Attorney, Agent, or Firm—Robert S. Honor; Richard E. Vila; Carol A. Loeschorn

[57] ABSTRACT

An admixture for inhibiting chloride-induced corrosion in steel reinforcing in place in concrete comprises an O/W emulsion wherein the oil phase comprises an unsaturated fatty acid ester and ethoxylated nonyl phenol and the ester of an aliphatic carboxylic acid with a mono-, di- or trihydric alcohol and the water phase comprises a saturated fatty acid, an amphoteric compound, a glycol and a soap. The admixture is added to the concrete prior to placement.

18 Claims, 2 Drawing Sheets

Cyclic Concrete Corrosion Test

Average of two specimens

ADMIXTURES FOR INHIBITING CORROSION OF STEEL IN CONCRETE

This invention relates to the corrosion inhibition of steel in concrete. In particular, this invention provides emulsified admixture compositions and methods for the inhibiting of corrosion of steel in concrete. This application is a continuation-in-part of Ser. No. 07/626,349 filed Dec. 12, 1990 now abandoned.

BACKGROUND OF THE INVENTION

Reinforcing steel in concrete is normally protected from corrosion by the highly alkaline concrete medium. However, corrosion of the steel can occur as a result of contact with chlorides which enter the concrete matrix from external application of de-icing chemicals, or from marine waters. This corrosion process can be accelerated by the propagation of cracks in the concrete, which can lead to direct exposure of the steel to the corrosive action of the chlorides. This corrosive activity eventually results in the loss of integrity of the concrete structure. This form of concrete structural degradation is a common occurrence in many locations.

Thus, there is a need for new corrosion inhibiting admixtures which protect reinforcing steel from the action of corrosive chloride agents.

SUMMARY OF THE INVENTION

This invention provides a method for inhibiting the corrosion of reinforcing steel in concrete, comprising adding to the concrete as an admixture an oil-in-water emulsion wherein
  (a) the oil phase of the emulsion comprises from 10-55% of an unsaturated fatty acid ester, from 1 to 15% of an ethoxylated C2-12alkyl phenol and from 1-5% of the ester of an aliphatic carboxylic acid with a mono-, di- or trihydric alcohol; and
  (b) the water phase of the emulsion comprises from 0.1-5.0% of a saturated $C_{12-30}$ fatty acid, from 0.1-1.0% of an amphoteric compound comprising at least one amine group and at least one acid group, from 2-10% of a glycol and from 0.1-2% of a soap;
all percentages being by weight of the total emulsion.

In a preferred embodiment of the invention, the admixture comprises an oil-in-water emulsion, wherein
  (a) the oil phase comprises from 10-55% of a $C_{4-15}$ alkyl or $C_{4-15}$ alkylene glycol oleate, from 3-15% of a ethoxylated nonyl phenol comprising from 2-4 oxyethylene units and from 2-5% of the ester of an aliphatic carboxylic acid with a mono-, di or trihydric alcohol, the total number of carbon atoms in the ester being from 8-46; and
  (b) the water phase comprises from 0.1-5.0% by weight of a saturated $C_{12-30}$ fatty acid, from 0.1 to 1.0% of an amphoteric compound comprising at least one amine group and at least one acid group, from 2-10% of a glycol, and from 0.1-2% of a soap.

The unsaturated fatty acid ester, which is preferably a $C_{4-15}$ alkyl or $C_{4-15}$ alkylene glycol oleate, is present preferably to the extent of from 15 to 30% of the emulsion. It is of course permissible to utilize more than one such compound and to mix the two types of compound. Typical examples of preferred compounds are n-butyl oleate and propylene glycol oleate.

The ethoxylated nonylphenol, which preferably comprises from 2-4 oxyethylene units per molecule, is present preferably to t-he extent of from 3 to 10%. There is available to the art a wide range of such compounds and any of those is suitable for use in the compositions of this invention. Again, more than one such compound may be used, as is the case with all other compounds described hereinunder for use in this invention.

The ester preferably comprises from 10-38 carbon atoms, more preferably from 12-30. The alcohol is preferably glycerol. Typical examples of suitable esters are lard monoglyceride, acetylated lard monoglyceride and ethoxylated castor glyceride.

The saturated fatty acid is present in the water phase preferably to the extent of from 0.1-5.0%, more preferably from 0.5 to 2.0 %, of the weight of the emulsion. Suitable acids include lauric, myristic, palmitic and stearic acids, stearic acid being particularly preferred.

The total quantity of saturated fatty acid+soap should be present to the extent of from 0.2-7.0%, preferably from 0.6-4.0%. Any soap may be used, calcium stearate being particularly preferred. A combination of calcium stearate and stearic acid is most preferred.

The amphoteric compound may be any compound of the type hereinabove described. Preferred amphoteric compounds include the reaction product of an alkyl acetic acid or an alkyl formic acid and a $C_{8-22}$ aliphatic amine. A particularly preferred type of amphoteric compound is a coco alkyl β-amino-propionic acid.

By "glycol" is meant any glycol, glycol ether or polyglycol in which the number of ether groups does not exceed 5. The preferred glycol is propylene glycol, but other glycols such as glycerol, ethylene glycol, butyl glycol, diethylene glycol, propylene glycol methyl ether and suitable members of the "Cellosolve" (trade mark) range of materials may also be used.

The emulsion may additionally comprise materials other than those hereinabove described, in water or oil phase or both of these phases, added in art-recognized quantities.

The oil phase of the emulsion may comprise from about 15% to about 65% of the total, preferably from about 20% to about 35% of the total weight of the emulsion.

The weight of the water in the total emulsion is from about 2OZ to about 80% preferably from about 50% to about 75%.

The admixture emulsions of this invention may be prepared by conventional means. They may be added to concrete during batching at a dosage of from about 0.3% to about 6.4%, preferably from about 1.3% to about 2.6%, based on the weight of the cement.

It has been found that steel reinforcing which is used in conjunction with a concrete composition which comprises an admixture emulsion as hereinabove described suffers considerably less from chloride-induced corrosion than does similar reinforcing which is subjected the same environment. The invention therefore also provides a concrete composition adapted to be used in conjunction with steel reinforcing, which composition comprises an admixture emulsion as hereinabove described. There is also provided a method for the protection from corrosion of steel reinforcing in place in concrete, comprising the addition to the concrete prior to pouring and setting in place around the reinforcing of an admixture emulsion as hereinabove described.

The emulsion admixtures of this invention are very stable under reasonable temperature fluctuations. Without restricting the scope of the invention in any way, it is believed that, upon contact with the high pH environment of concrete, the emulsion collapses, allowing contact between the active agents and steel reinforcing bars. The emulsion allows for uniform distribution of the active agents in the concrete which aids in uniform corrosion protection.

Figure 1:
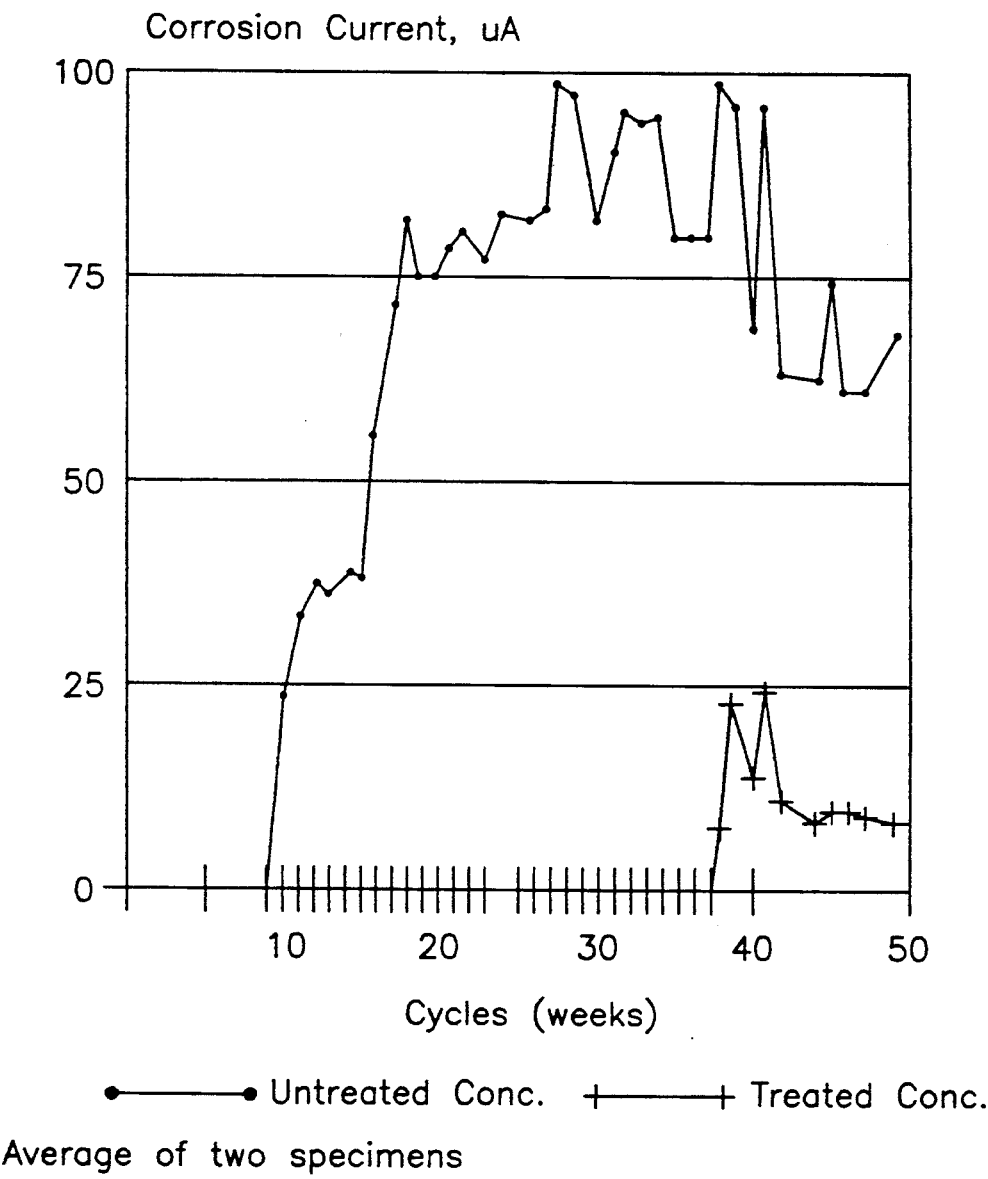
FIG. 1 shows the corrosion activity of steel embedded in non-treated concrete, as well as concrete containing a formulation of the invention, used at a rate of 1.3Z by weight of the cement.

The invention is further described with reference to the following examples.

The following Emulsion Admixture Formulation A of this invention is used in the examples.

EMULSION ADMIXTURE FORMULATION A

This particular emulsion admixture is available under the trade name, "Ferma Emulfix" LL ex Kemisk Vaerk Koge A/S, Denmark

| Components | % by Weight of Components of Total Emulsion |
| --- | --- |
| Coco alkyl β-amino-propionic acid | 0.3 |
| N-butyl oleate | 21 |
| Propylene glycol dioleate | 8 |
| Poly(2)ethoxylated nonylphenol | 1.5 |
| Poly(4)ethoxylated nonylphenol | 1.5 |
| Stearic acid | 0.6 |
| Lard monoglyceride | 0.5 |
| Acetylated lard monoglyceride | 2.5 |
| Propylene glycol | 8.0 |
| Calcium stearate | 0.15 |
| Water | 55.95 |

The concrete mix design for Examples 1 and 2 is as follows:

| | |
| --- | --- |
| Type 1 Cement | 217 kg. |
| Fine Aggregate | 700 kg. |
| Coarse Aggregate (1.9 cm Maximum size aggregate) | 866 kg. |
| Water (0.48 water/cement) | 105 kg. |
| Slump | 5.1 cm |
| Air Content | 2.5 % |
| Unit Weight | 2403 kg./cu.M. |

The testing method used in Example 1 described hereinunder is the Time-to-Corrosion method ("Protective Systems for New Prestressed and Substructure Concrete". U.S. Dept. of Transportation, Federal Highway Administration, Report No. FHWA/RD-86/193, Apr. 1987, 126 pp). This was developed to simulate closely field placements of concrete. The method quantifies the corrosion activity in reinforced concrete which is exposed to prolonged chloride attack. The testing consists of the fabrication of concrete specimens of dimensions 12 inches×12 inches ×7 inches (30.5 cm×30.5 cm×17.8 cm), in duplicate for each treatment examined, which contain mats of steel reinforcing bars with two bars located one inch (2.5 cm)below the top surface and four bars located four inches (10 cm) below the first level. The mats are electrically connected by a resistor, and the resulting cathodic (bottom mat) to anodic (top mat) surface area gradient is designed to accelerate the corrosion process. The testing involves cycles of sodium chloride ponding followed by air drying, with periodic measurement of macrocell corrosion current between the upper and lower bars, anodic half-cell potential of the specimen, and mat-to-mat resistance between the reinforcement layers.

In the case of Example 2, the test method is essentially the same with the following differences:

(a) The test specimens are beams of dimensions 3 in. (depth)×4 in. (width)×14 in. (length) (7.6 cm×10.2 cm×35.5 cm); and (b) one bar is located one inch (2.5 cm) below the top surface of the beam with two further bars located 0.5 in. (1.3 cm) from the bottom surface.

EXAMPLE 1

Concrete specimens, with and without the incorporation therein of Emulsion Admixture Formulation A, are fabricated with two mats of steel reinforcement. In the case of the addition of the admixture, it is used at a 50% dilution at a rate of 1.3% by weight of cement. The mats are electrically connected with a 10 ohm resistor which allows for the direct measurement of corrosion activity by the Time-to-Corrosion method hereinabove described. The top faces of the specimens are subjected to cycles consisting of four days of exposure to a concentrated (15%) sodium chloride solution and three days of drying, for a total of 48 cycles. Corrosion currents are measured weekly. The performance of the specimens containing the admixture is appreciably superior to that of the specimens which contained not admixture. The results are shown in FIG. 1.

EXAMPLE 2

Figure 2:
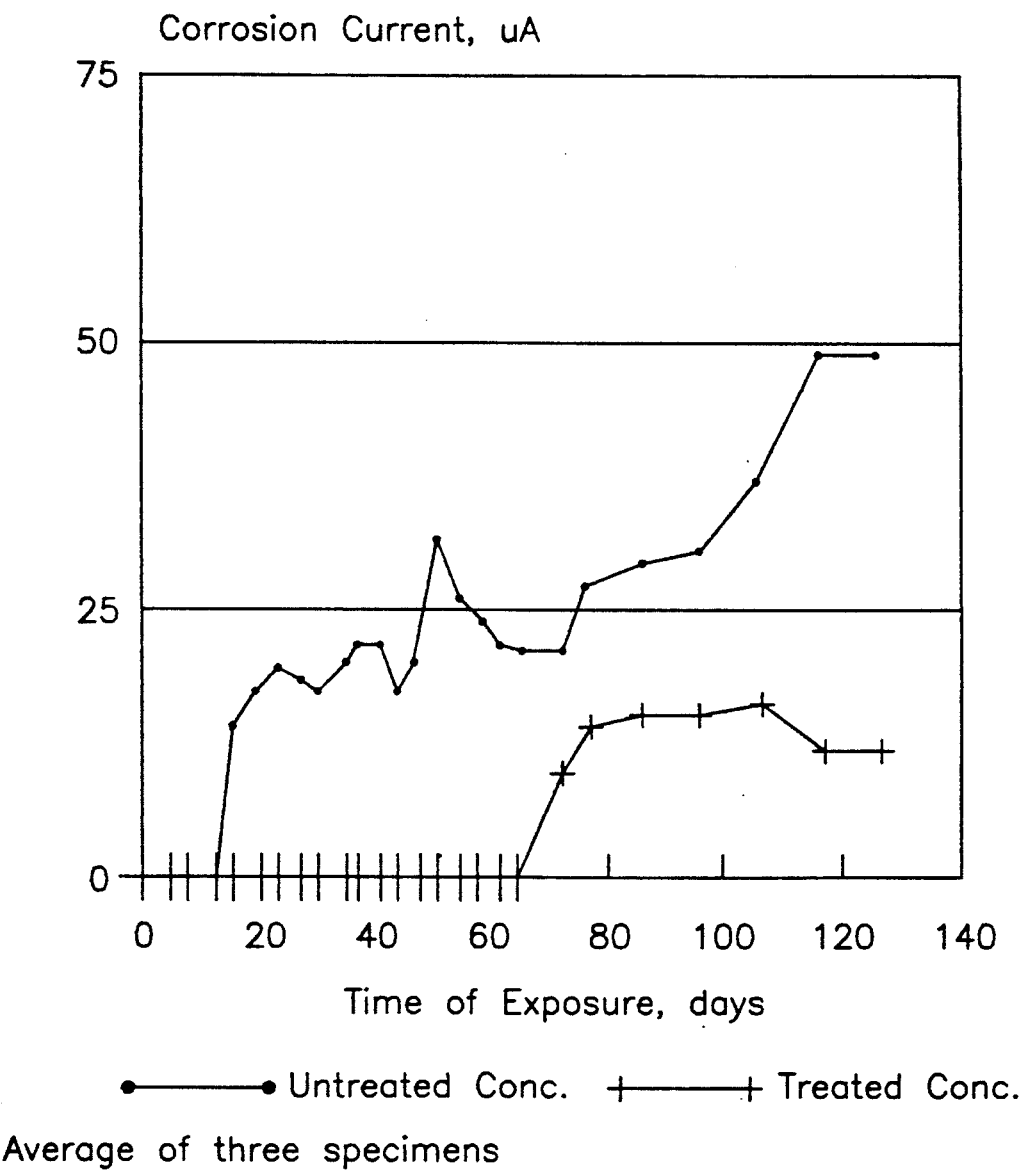
FIG. 2 shows the corrosion activity of steel embedded in non-treated concrete as well as concrete containing a formulation of the invention, used at a rate of 0.6Z by weight of the cement.

Concrete beams, again with and without the admixture (added undiluted at a rate of 0.6% by weight of cement), are fabricated with two mats of steel reinforcement. The mats are electrically connected by a 10 ohm resistor which allows for the direct measurement of corrosion activity as hereinabove described. After normal curing of the concrete, a crack, perpendicular to the axis of the reinforcement, is expressed from the top surface of each beam down to the level of the upper layer of reinforcing steel. The top, cracked faces of the concrete beams are then exposed continuously to a concentrated (10%) sodium chloride solution. Corrosion currents are measured periodically. The performance of the admixture-containing beams is appreciably superior to those lacking the admixture. The results are shown in FIG. 2.

We claim:

1. A method for inhibiting the corrosion of reinforcing steel in concrete, comprising adding to the concrete an oil-in-water emulsion wherein (a) the oil phase of the emulsion comprises from 10–55% of an unsaturated fatty acid ester, from 1 to 15% of an ethoxylated C6–12 alkyl phenol and from 1–5% of the ester of an aliphatic carboxylic acid with a mono-, di- or trihydric alcohol; and (b) the water phase of the emulsion comprises from 0.1–5.0% of a saturated $C_{12-30}$ fatty acid, from 0.1–1.0% of an amphoteric compound comprising at least one amine group and at least one acid group, from 2–10% of a glycol, from 0.1–2% of a soap; (C) and from 20–80% water.

2. A method for inhibiting the corrosion of reinforcing steel in concrete, comprising adding to the concrete an oil-in-water emulsion wherein
(a) the oil phase of the emulsion comprises from 10–55% by weight of the emulsion of a $C_{4-15}$ alkyl or $C_{4-15}$ alkylene glycol oleate, from 3–15% of a ethoxylated nonyl phenol comprising from 2–4 oxyethylene units and from 2–5% of the ester of an aliphatic carboxylic acid with a mono-, di or trihydric alcohol, the total number of carbon atoms in the ester being from 8–46; and
(b) the water phase of the emulsion comprises from 0.1–5.0% by weight of the emulsion of a saturated $C_{12-30}$ fatty acid, from 0.1 to 1.0% of an amphoteric compound comprising at least one amine group and at least one acid group, from 2–10% of a glycol, from 0.1–2% of a soap; (C) and from 20–80% water.

3. The method according to claim 1 or 2, wherein the alkyl or alkylene glycol oleate is present to the extent of from 15–30% by weight of the emulsion.

4. The method according to claim 1 or 2, wherein the ethoxylated nonyl phenol is present to the extent of from 5–10% by weight of the emulsion.

5. The method according to claim 1 or 2, wherein the saturated fatty acid+soap comprise from 0.6–4.0% by weight of the emulsion.

6. The method according to claims 1 or 2, wherein the amphoteric compound is a coco alkyl β-amino-propionic acid.

7. The method according to claims 1 or 2, wherein the oil phase comprises from 15 to 65%, preferably 20 to 35% of the total weight of the emulsion.

8. The method according to claim 1 or 2, wherein the weight of water in the total emulsion is from 50–75%.

9. A concrete composition adapted to be used in conjunction with steel reinforcing to inhibit the corrosion of the steel, into which composition is incorporated an admixture emulsion according to claim 1 or 2.

10. A method for inhibiting the corrosion of reinforcing steel in concrete, comprising adding, to the concrete the active agents of an oil-in-water emulsion wherein
(a) the oil phase of the emulsion comprises from 10–55% of an unsaturated fatty acid ester, from 1 to 15% of ethoxylated C6–12 alkyl phenol and from 1–5% of the ester of an aliphatic carboxylic acid with mono-, di- or trihydric alcohol; and
(b) the water phase of the emulsion comprises from 0.1–5.0% of a saturated $C_{12}$-30 fatty acid, from 0.1–1.0% of an amphoteric compound comprising at least one amine group and at least one acid group, from 2–10% of a glycol and from 0.1–2% of a soap; (C) and from 20–80% water.

11. A method for inhibiting the corrosion of reinforcing steel in concrete, comprising adding to the concrete the active agents of an oil-in-water emulsion wherein
(a) the oil phase of the emulsion comprises from 10–55% by weight of the emulsion of a $C_{4-15}$ alkyl or $C_{4-15}$ alkylene glycol oleate, from 3–15% of a ethoxylated nonyl phenol comprising from 2–4 oxyethylene units and from 2–5% of the ester of an aliphatic carboxylic acid with a mono-, di or trihydric alcohol, the total number of carbon atoms in the ester being from 8–46; and
(b) the water phase of the emulsion comprises from 0.1–5.0% by weight of the emulsion of a saturated $C_{12-30}$ fatty acid, from 0.1 to 1.0% of an amphoteric compound comprising at least one amine group and at least one acid group, from 2–10% of a glycol and from 0.1–2% of a soap;
(C) and from 20–80% water.

12. The method according to claim 10 or 11, wherein the alkyl or alkylene glycol oleate is present to the extent of from 15–30% by weight of the emulsion.

13. The method according to claim 10 or 11, wherein the ethoxylated nonyl phenol is present to the of from 5–10% by weight of the emulsion.

14. The method according to claim 10 or 11, wherein the saturated fatty acid+soap comprise from 0.6–4.0% by weight of the emulsion.

15. The method according to claim 10 or 11, wherein the amphoteric compound is a coco alkyl β-amino-propionic acid.

16. The method according to claim 10 or 11, wherein the oil phase comprises from 15 to 65%, preferably 20 to 35% of the total weight of the emulsion.

17. The method according to claims 10 or 11, wherein the weight of water in the total emulsion is from 50–75%.

18. A concrete composition adapted to be used in conjunction with steel reinforcing to inhibit the corrosion of the steel, into which composition is incorporated the active agents an admixture emulsion according to claim 10 or 11.

* * * * *